United States Patent
Ye et al.

(10) Patent No.: US 12,487,402 B2
(45) Date of Patent: Dec. 2, 2025

(54) DOUBLE BLADE DICING OF LITHIUM-CONTAINING PHOTONICS DEVICES

(71) Applicant: HyperLight Corporation, Cambridge, MA (US)

(72) Inventors: Fan Ye, Lincoln, MA (US); Ying Wang, Somerville, MA (US); Roy Meade, Bastrop, TX (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 18/817,075

(22) Filed: Aug. 27, 2024

(65) Prior Publication Data

US 2025/0076578 A1 Mar. 6, 2025

Related U.S. Application Data

(60) Provisional application No. 63/536,647, filed on Sep. 5, 2023.

(51) Int. Cl.
*G02B 6/13* (2006.01)
*G02B 6/25* (2006.01)

(52) U.S. Cl.
CPC ............... *G02B 6/13* (2013.01); *G02B 6/25* (2013.01)

(58) Field of Classification Search
CPC .................................... G02B 6/13; G02B 6/25
USPC ............................................................ 385/38
See application file for complete search history.

(56) References Cited

U.S. PATENT DOCUMENTS

| | | | |
|---|---|---|---|
| 8,885,677 B1 * | 11/2014 | Kupershmidt | H01S 5/141 372/28 |
| 9,224,650 B2 * | 12/2015 | Lei | B23K 26/402 |
| 9,435,949 B2 * | 9/2016 | Shimizu | G02B 6/1228 |
| 9,589,812 B2 * | 3/2017 | Takahashi | B81C 1/00619 |
| 11,085,998 B2 * | 8/2021 | Sayyah | G01S 7/4818 |
| 11,137,559 B2 * | 10/2021 | Lai | G02B 6/4259 |
| 2019/0018198 A1 * | 1/2019 | Sayyah | G01S 17/32 |
| 2020/0209476 A1 * | 7/2020 | Mattis | H01L 21/78 |
| 2022/0080529 A1 * | 3/2022 | Nagaraj | C03B 33/0222 |
| 2022/0252958 A1 * | 8/2022 | Fejer | G02F 1/3558 |
| 2023/0305326 A1 | 9/2023 | Luke | |

FOREIGN PATENT DOCUMENTS

CA 2194821 * 11/2001 ............. H01S 3/085

OTHER PUBLICATIONS

"Integrated Thermally Tuned Mach-Zehnder Interferometer in Z-Cut Lithium Niobate Thin Film" by Chen et al, IEEE Photonics Technology Letters, vol. 33, No. 13, pp. 664-667 (Year: 2021).*

(Continued)

*Primary Examiner* — Robert Tavlykaev
(74) *Attorney, Agent, or Firm* — Van Pelt, Yi & James LLP

(57) ABSTRACT

A singulated thin film lithium containing (TFLC) photonics device, as well as a method and system for singulating the device are described. The TFLC photonics device includes a device layer and a silicon substrate. The device layer includes a TFLC layer having a depth. The device layer also has a first sawn edge. The silicon substrate has a second sawn edge and includes an upper portion and a lower (Continued)

portion. The upper portion has the second sawn edge that is mutually aligned with the first sawn edge. The upper portion overhangs the lower portion.

18 Claims, 6 Drawing Sheets

(56) References Cited

OTHER PUBLICATIONS

"Review of Wafer Dicing Techniques for Via-Middle Process 3DI/TSV Ultrathin Silicon Device Wafers" by Hooper et al, Electronic Components & Technology Conference, pp. 1436-1446, (Year: 2015).*
"Advanced Dicing Technologies for Combination of Wafer to Wafer and Collective Die to Wafer Direct Bonding" by Inoue et al, IEEE 69th Electronic Components and Technology Conference, pp. 437-445 (Year: 2019).*
"Effect of Laminated Wafer Toward Dicing Process and Alternative Double Pass Sawing Method to Reduce Chipping" by Jiun et al, IEEE Transactions of Electronics Packaging Manufacturing, vol. 29, No. 1, pp. 17-24 (Year: 2006).*
"CW demonstration of SHG spectral narrowing in a PPLN waveguide generating 2.5 W at 780 nm" by Carpenter et al, Optics Express, vol. 28, No. 15, pp. 21382-21390, (Year: 2020).*
"Precision Dicing of Optical Materials" by Carpenter et al, Integrated Optics: Devices, Materials, and Technologies XVIII, Proc. of SPIE vol. 8988, paper 898813 (Year: 2014).*
Carpenter et al., Low Optical-loss Facet Preparation for Silica-on-Silicon Photonics using the Ductile Dicing Regime, IOP Publishing, Journal of Physics D: Applied Physics, published Oct. 31, 2013, pp. 1-8.
Courjal et al., High Aspect Ratio Lithium Niobate Ridge Waveguides Fabricated by Optical Grade Dicing, Article in Journal of Physics D, Jul. 2011, 13 pages.
Courjal et al., Simple Production of Membrane-based LiNbO3 Micro-Modulators with Integrated Tapers, Article in Optics Letter, Nov. 2016, 6 pages.
Yuan et al., Precision Machining by Dicing Blades: A Systematic Review, Machines 2023, Feb. 9, 2023, pp. 1-29.

* cited by examiner

DOUBLE BLADE DICING OF LITHIUM-CONTAINING PHOTONICS DEVICES

CROSS REFERENCE TO OTHER APPLICATIONS

This application claims priority to U.S. Provisional Patent Application No. 63/536,647 entitled DOUBLE BLADE DICING filed Sep. 5, 2023 which is incorporated herein by reference for all purposes.

BACKGROUND OF THE INVENTION

Thin film lithium-containing (TFLC) electro-optic materials include thin film lithium niobate (TFLN) and thin film lithium tantalate (TFLT). TFLC materials may have a large modulation in the index of refraction for a given applied electric field, which is desirable for photonics devices. In order for TFLC photonics devices to perform their functions, optical signals are coupled into and out of the TFLC photonics device. For example, the TFLC photonics device may have facet(s) at its edge(s). Optical fibers may be mechanically and optically coupled to the facets. Optical signals carried by the optical fiber are transmitted through the facet to a waveguide (or analogous structure) in the TFLC photonics device, and vice versa. The optical coupling between the fiber and the waveguide is desired to have low losses for improved efficiency of the photonics device. To reduce optical losses, the facet is desired to have a low surface roughness.

In order to fabricate a TFLC photonics device, optical structures may be fabricated from the TFLC layer via photolithography and/or other techniques. Additional components, such as electrodes, contacts, and/or cladding may also be formed using analogous processes. Typically, many TFLC photonics devices are formed on a wafer. Once fabricated, the individual photonics devices (e.g. photonic integrated circuits) are singulated. Stated differently, the photonics devices fabricated on a single wafer are separated into individual photonics devices. Singulation of TFLC optical circuits is desired to be fast, to be scalable, and to provide low insertion loss photonics devices. Moreover, such techniques are desired to have sufficiently high yield. Thus, the photonics devices should not be overly susceptible to chipping or other issues during singulation. The systems and method described herein may address this need.

BRIEF DESCRIPTION OF THE DRAWINGS

Various embodiments of the invention are disclosed in the following detailed description and the accompanying drawings.

DETAILED DESCRIPTION

Figure 1:
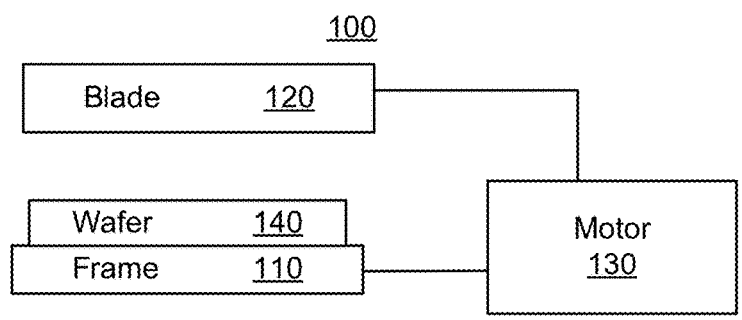
FIG. 1 is a block diagram depicting an embodiment of a system for singulating a photonic device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A singulated thin film lithium containing (TFLC) photonics device, as well as a method and system for singulating the device are described. The TFLC photonics device includes a device layer and a silicon substrate. The device layer includes a TFLC layer having a depth. The TFLC layer may include or be formed into one or more components. For example, the TFLC layer may include a waveguide. The device layer also has a first sawn edge. The silicon substrate has a second sawn edge and includes an upper portion and a lower portion. The upper portion has the second sawn edge that is mutually aligned with the first sawn edge. In some embodiments, the first sawn edge and the second sawn edge are part of a single sawn edge. The upper portion overhangs the lower portion.

In some embodiments, the first sawn edge has a root mean square (RMS) surface roughness not exceeding one hundred and fifty nanometers. In some embodiments, the RMS surface roughness does not exceed one hundred nanometers. The first sawn edge may have an optical insertion loss of not more than 2.5 dB per facet.

The upper portion of the silicon substrate may overhang the lower portion by at least five micrometers and not more than thirty micrometers. In some embodiments, the upper portion overhangs the lower portion by at least ten micrometers and not more than twenty micrometers. The lower portion may have a third sawn edge.

The singulated TFLC photonics device may include a passivation layer on the first sawn edge. The passivation layer may be a layer deposited on the first sawn edge or the TFLC layer may terminate a distance from the first sawn edge. In some such embodiments, a portion of the passivation layer is on the upper portion of the silicon substrate. The device layer may include a buried oxide (BOX) between the TFLC layer and the silicon substrate. The TFLC layer may include lithium niobate (LN) and/or lithium tantalate (LT).

A dicing system is described. The dicing system includes a frame, a blade, and a motor. The frame supports a wafer having a TFLC layer and a silicon substrate. The TFLC layer is at a depth. The blade is oriented to produce a cut through a surface of the wafer such that the cut extends through the depth of the TFLC layer into the silicon substrate but does not extend all the way through the silicon substrate. Therefore, a groove is formed. The groove may have a surface roughness not exceeding one hundred and fifty nanometers. The motor rotates the blade at a nominal revolutions per minute (rpm). The blade may be dressed by the silicon substrate as it cuts through the depth of the TFLC layer. In some embodiments, an additional blade is oriented to produce an additional cut through a back surface of the silicon substrate such that the additional cut intersects the groove.

The nominal rpm of the blade may be at least 20 kilo-rpm (krpm) and not more than 40 krpm. In some such embodiments, the nominal rpm is at least 25 krpm and not more than 35 krpm. Further, the cut may correspond to a feed speed of at least 4 millimeters per second and not more than 15 millimeters per second. In some embodiments, the blade includes Ni and is not more than 13 micrometers thick. In some embodiments, the blade includes resin and is not more than 110 micrometers thick.

A method for singulating a TFLC photonics device from a wafer is described. The method includes supporting the wafer in a frame. The wafer includes a silicon substrate and a device layer having a TFLC layer at a depth. The method also includes cutting, using a blade, through a surface of the wafer to produce a cut. The cut extends through the depth of the TFLC layer into the silicon substrate but does not extend all the way through the silicon substrate. Therefore, a groove having a first sawn edge is formed. The blade rotates at a nominal revolutions per minute (rpm) for the cutting. The method also includes performing an additional cutting, using an additional blade. The additional cutting is through a back surface of the silicon substrate to produce an additional cut that intersects the groove. The additional blade rotates at an additional nominal rpm for the additional cutting.

FIG. 1 is a block diagram depicting an embodiment of dicing system 100. Dicing system 100 is used in singulating devices from a wafer. For example, dicing system 100 may be used in singulating thin film lithium containing (TFLC) photonics devices, such as thin film lithium niobate (TFLN) and/or thin film lithium tantalate (TFLT) devices. Certain components are shown for simplicity. In some embodiments, other and/or additional components may be present.

Dicing system 100 includes frame 110, blade 120, and motor 130. Dicing system 100 is shown with wafer 140 attached to frame 110. Wafer 140 includes a substrate (not separately shown) and at least one TFLC layer (not separately shown). Wafer 140 may be considered to include a substrate and a device layer on the substrate. In some embodiments, the substrate is a silicon substrate. The device layer includes TFLC photonics devices. The TFLC photonics devices may include the TFCL layer(s) and other components (e.g. electrodes, cladding, buried oxide (BOX)). The TFLC layer(s) may be formed into or include waveguides and/or other structures (e.g. mode converters, polarization rotation beam splitters, etc.). The TFLC layer of wafer 140 is at a depth from the surface of the wafer.

Frame 110 may be considered a holder to which wafer 140 may be attached. In some embodiments, frame 110 includes a ring that is appropriately sized for wafer 140 (e.g. for a 6 inch or 8 inch wafer) and tape or other adhesive to which wafer 140 may be temporarily affixed. Blade 120 is attached to motor 130, for example at a spindle (not separately shown) of motor 130. Motor 130 is used to spin blade 120 at the desired nominal frequency. The nominal frequency of rotation of blade 120 is generally at least twenty kilo revolutions per minute (krpm). For example, motor 130 of dicing system 100 may be capable of turning blade 120 at frequencies on the order of twenty krpm through fifty-five or sixty krpm. Blade 120 may be a circular blade embedded with grit that is configured to cut through wafer 140 when blade 120 is spun. For example, blade 120 may be a Ni-containing (e.g. a Ni or Ni alloy) blade. In other embodiments, blade 120 may be a resin blade. Different blades 120 may have different grit size or type (e.g. diamond or other particles) embedded therein. Different blades 120 may be used for different cuts in the dicing. For example, blades 120 having different widths (which result in different kerfs, or widths of the cut) and/or different sized grit may be used in conjunction with dicing system 100.

In operation, wafer 140 is affixed to frame 110. Blade 120 is oriented to produce a cut through a surface of wafer 140. In some embodiments, blade 120 is oriented perpendicular to the surface of wafer 140. Blade 120 is rotated at a nominal frequency and cuts through desired portions of wafer 140. A cut extends through the depth of the TFLC layer into the silicon substrate but does not extend all the way through the silicon substrate. This process may be repeated to form the cuts from the front side (i.e. the surface having the TFLC layer closest to the surface or the surface proximate to the device layer) of wafer 140. Therefore, grooves are formed. Each groove has sawn sides, which form portions of the sawn edges of the photonics devices being singulated. The groove may have a surface roughness not exceeding one hundred nanometers. For the cut through the TFLC layer that forms the groove, the nominal frequency (or nominal rpm) of blade 120 may be at least 20 krpm and not more than 40 krpm. In some such embodiments, the nominal rpm is at least 25 krpm and not more than 35 krpm. For example, the nominal frequency may be 30 krpm. Further, the cut may correspond to a feed speed (the speed of the blade horizontally across the surface of wafer 120) of greater than three millimeters per second and not more than fifteen millimeters per second. The feed speed may be at least four millimeters per second and not more than ten millimeters per second (e.g. five to ten millimeters per second). In some embodiments, the feed speed may be at least four millimeters per second and not more than six millimeters per second (e.g. nominally five millimeters per second). In some embodiments, blade 120 includes Ni and is not more than 13 micrometers wide. The groove may thus be not more than nominally thirteen micrometers (e.g. 12.5 micrometers±2.5 micrometers) wide. In some embodiments, blade 120 may include resin and may be not more than 100 micrometers wide. In some embodiments, the groove is nominally one hundred micrometers deep. The grit size of blade 120 for this cut may be high, which corresponds to smaller particles and a smoother sawn edge. For example, in some embodiments, grit #5000 may be used. Blade 120 may be dressed (e.g. by the silicon substrate) as it makes the cut. Stated differently, particles of wafer 140 (e.g. silicon substrate) are carried by spinning blade 120 during the cut and aid in making the cut.

Blade 120 may be switched for another blade for a second series of cuts from the back side (e.g. from the silicon substrate) to be performed. The (optionally new) blade 120 is oriented to form cuts in the substrate of wafer 140. For example, in some embodiments, wafer 140 may be flipped for the second set of cuts such that the back side (e.g. a bottom surface of the silicon substrate) is proximate to blade 120. In some embodiments, blade 120 is oriented substantially perpendicular to the back surface of wafer 120. Blade 120 may also be aligned, e.g. using an infrared camera or alignment cuts, so that the cuts made by blade 120 intersect the grooves.

In some embodiments, new blade 120 for these cuts is wider than the groove. For example, new blade 120 (and thus the cuts made) may be at least four micrometers wider than the previous blade or groove. In some embodiments, the cut (new blade 120) may be at least five micrometers or more (e.g. at least ten micrometers, at least twenty micrometers, at least thirty micrometers, at least forty micrometers, at least fifty micrometers, or at least sixty micrometers) wider than the groove (blade 120). In some embodiments, the new blade 120 is one hundred micrometers through two hundred micrometers wider than blade 120 used for the first cuts. In some embodiments, the second cuts are not more than at least forty micrometers and not more than sixty micrometers wide. Thus, the portion of the edge including the device layer (and formed by the first cut(s) of blade 120) may overhang a portion of the substrate (formed by the second cut(s) of blade 120) by at least five micrometers and not more than twenty or thirty micrometers. In some embodiments, the overhang is at least ten micrometers. In some embodiments, a thinner blade 120 may be used for the second cuts and/or multiple cuts may be made from this side to form the overhang. Other widths of cuts and/or overhangs may be possible. However, in general, an overhang is desired to be present.

The additional cuts formed by blade 120 in the substrate may also be deeper than the groove. Because the edges of the substrate are not configured to transmit an optical signal, the surface roughness of the cut formed by new blade 120 may be higher. Thus, a lower number grit (larger grit size) may be used. For example, in some embodiments, the grit size used is #2000 (i.e. larger particles of grit than for the first cut(s)). However, the spindle speed (the frequency of rotation of blade 120) may be in the same ranges as for the first cuts. In some embodiments, the feed speed for the second cut(s) may be higher than for the first cut(s) by blade 120. Thus, the second set of cuts from (possibly second) blade 120 separates the photonics devices from wafer 140.

Dicing system 100 may be used to singulate TFLC photonics devices from wafer 140. Because dicing system 100 uses blade(s) 120 to make two cuts on opposite surfaces of wafer 140, the singulated TFLC photonics devices have sawn edges (e.g. edges formed by cuts of blade(s) 120). This is in contrast to conventional photonics devices, for which at most only a portion of the edges are sawn. Instead, some or all of the edges may be cleaved (e.g. formed by a crack that has propagated through a portion of the substrate) or otherwise separated. In addition, the sawn edges of the photonics devices formed may have a lower surface roughness at least in the region of TFLC layer. This may be achieved through a combination of a sufficiently high grit number (small sized grit), spindle speed (or frequency of rotation of blade 120), and feed speed. As indicated, blade 120 may be rotated with a nominal frequency of up to fifty or sixty krpm. In general, it is believed that a higher nominal frequency produces smoother surfaces. However, it has been determined that a lower nominal frequency for blade 120 results in smoother sawn edges for wafer 140. For example, nominal frequencies of greater than forty krpm may result in rougher sidewalls, chipping, and/or delamination of the TFLC layer. Thus, blade 120 is rotated at nominal frequencies of not more than forty krpm and, in some embodiments, at least twenty-five krpm and not more than thirty-five krpm. Consequently, the sawn edges of photonics devices singulated from wafer 140 may have a sufficiently low surface roughness that insertion losses are improved. Moreover, chipping and other issues may be reduced, thereby improving yield. The overhang of the device layer formed by the combination of the first cut(s) and second cut(s) may also facilitate alignment and reduce insertion losses. As a result, manufacturing and performance of TFLC photonics devices may be enhanced. In general, performing blade dicing and creating sawn edges, although an economic chip singulation method, is not seen as a technique fit for fragile materials such as TFLC layers, for example due to chipping. However, dicing system 100 may improve performance.

Figure 2A:
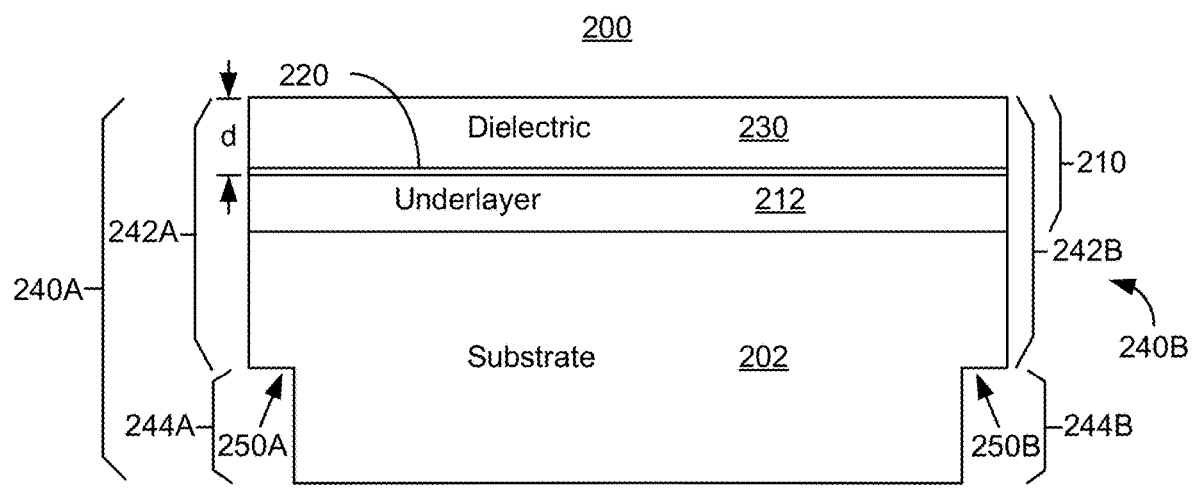
FIGS. 2A-2C are diagrams depicting embodiments of photonics devices that have been singulated.
Figure 2B:
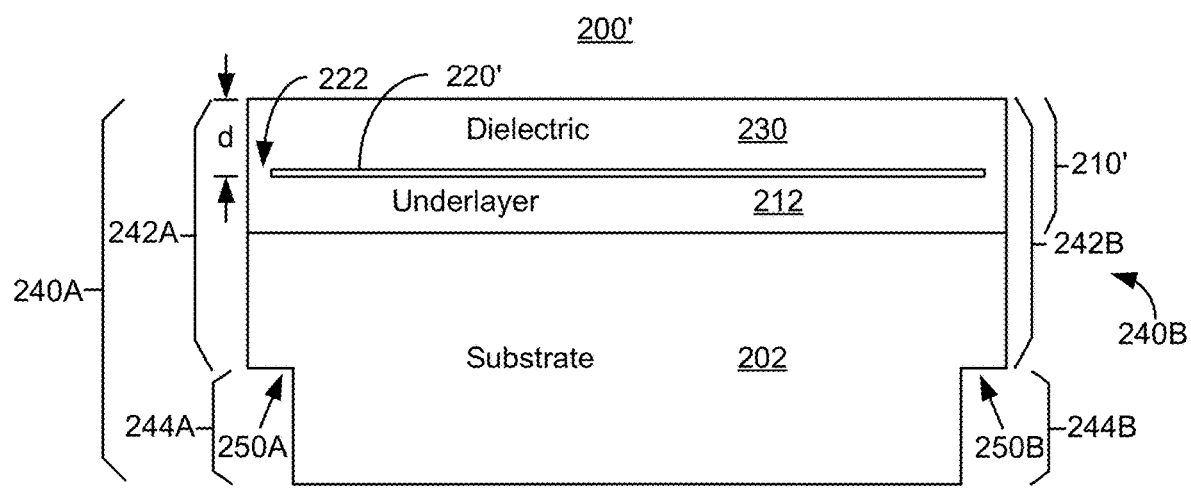
Figure 2C:
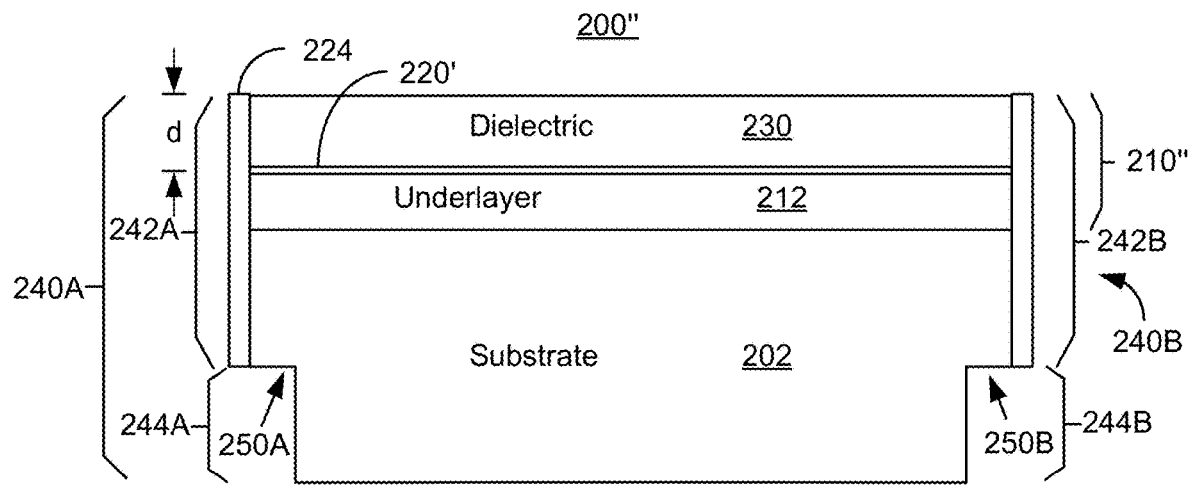

FIGS. 2A-2C are diagrams depicting embodiments of photonics devices 200, 200', and 200" that have been singulated. In some embodiments, photonics device 200, 200', and 200" are singulated using dicing system 100. For clarity, not all components are explicitly shown and FIGS. 2A-2C are not to scale.

FIG. 2A depicts photonics device 200 including substrate 202 and device layer 210. Opposing edges 240A and 240B are also shown. Substrate 202 may be a silicon substrate. Device layer 210 includes underlayer 212, TFLC layer 220, and dielectric 230. Underlayer 212 may be a BOX layer, such as silicon dioxide. Underlayer 212 may be not more than ten micrometers thick. Dielectric 230 may be or include a cladding layer, such as silicon dioxide. TFLC layer 220 may be or include TFLN and/or TLFT. Although indicated as extending from one edge 240A to the opposing edge 240B, TFLC layer may intersect only one edge 240A or 240B and/or may intersect the edges that are out of the plane of the page. TFLC layer 220 may be less than one micrometer thick after processing. For example, TFLC layer 220 may be not more than five hundred nanometers thick. Although shown as a simple layer having a constant thickness, TFLC layer 220 may be formed into various structures having various widths (i.e. perpendicular to the plan of the page) and heights. Device layer 210 may be on the order of ten to fifteen micrometers thick (e.g. at least four micrometers and not more than fifteen micrometers thick). TFLC layer 220 is at a depth, d, from the top surface of photonics device 200. For example, the depth, d, of TFLC layer 220 may be three micrometers or less. Although not shown, device layer 210 may include other structures including but not limited to electrodes.

Edges 240A and 240B are sawn edges. Thus, sawn edges 240A and 240B are formed by dicing, for example using dicing system 100. Sawn edge 240A has an upper portion 242A that includes device layer 210 and lower portion 244A that is for substrate 202. Overhang 250A is between portions 242A and 244A. Similarly, sawn edge 240B has an upper portion 242B that includes device layer 210 and lower portion 244B that is for substrate 202. Portions 242B and 244B are separated by overhang 250B.

Upper portions 242A and 242B extend through device layer 210 and into substrate 212. In some embodiments, upper portions 242A and 242B of sawn edges 240A and 240B are 50-100 micrometers (e.g. nominally seventy micrometers) thick for photonics device 200 having a substrate 202 thickness of approximately seven hundred micrometers. Upper portions 242A and 242B may each have a low root mean square (RMS) surface roughness. In some embodiments, each of upper portions 242A and 242B has an RMS surface roughness not exceeding five hundred nanometers. The RMS surface roughness for each of upper portions 242A and 242B may not exceed one hundred and fifty nanometers. In some embodiments, this RMS surface roughness does not exceed one hundred nanometers and is greater than zero. In some such embodiments, the RMS surface roughness may be not more than eighty nanometers. In addition to the surface roughness being low, the insertion loss for optical signals input to and/or output from TFLC layer 220 may be low. For example, the insertion loss may be not more than 2.5 dB per facet. In some embodiments, the optical insertion loss is not more than 1.5 dB per facet.

Lower portions 244A and 244B extend through a portion of substrate 202. In some embodiments, lower portions 244A and 244B do not extend into device layer 210. In some embodiments, lower portions 244A and 244B are longer than upper portions 242A and 242B. For example, lower portions 244A and 244B may have a thickness of greater than six hundred nanometers. Because lower portions 244A and 244B need not support an optical signal, the RMS surface roughness of each of lower portions 244A and 244B may be greater than for upper portions 242A and 242B. The RMS surface roughness of each of lower portions 244A and 244B may be less than five hundred nanometers. For example, the RMS surface roughness of each of lower portions 244A and 244B may be on the order of one hundred nanometers.

Upper portions 242A and 242B are to be coupled with optical fibers, which may be held by a fiber array unit. To improve optical coupling, upper portions 242A and 242B are desired to be flush or nearly flush with the optical fibers. Consequently, overhangs 250A and 250B are provided. Overhangs 250A and 250B are sufficiently wide that any registration error between the cuts that form sawn edges 240A and 240B and the surface roughnesses of sawn edges 240A and 240B may be accounted for. For example, the registration error may be on the order of 2-5 micrometers and the RMS surface roughness of each of sawn edges 240A and 240B may be one hundred nanometers. A safety factor of three micrometers may also be desired. In such a case, overhangs 250A and 250B may be at least 8.1 micrometers. In some embodiments, overhangs 250A and 250B each have a width of at least five micrometers and not more than eighty micrometers. In some embodiments, the overhang is at least ten micrometers and not more than thirty micrometers.

FIG. 2B depicts photonics device 200' that is analogous to photonics device 200. Photonics device 200' includes substrate 202 and device layer 210' that are analogous to substrate 202 and device layer 210 of photonics device 200. Opposing sawn edges 240A and 240B of photonics device 200' are analogous to sawn edges 240A and 240B of photonics device 200. Upper portions 242A and 242B, overhangs 250A and 250B, and lower portions 244A and 244B are analogous to upper portions 242A and 242B, overhangs 250A and 250B, and lower portions 244A and 244B. Device layer 210 includes underlayer 212, TFLC layer 220', and dielectric 230 that are analogous to underlayer 212, TFLC layer 220, and dielectric 230. However, TFLC layer 220' is recessed from sawn edges 240A and 240B by working distance 222. Working distance 222 may be considered to form a passivation layer for TFLC layer 220'. Working distance 222 may be at least one hundred nanometers and not more than five hundred nanometers. In photonics device 200', working distance 222 is provided by terminating TFLC layer 220' such that the TFLC layer 220' is not present in the region of the cut. Thus, TFLC layer 220' is not exposed to the ambient.

FIG. 2C depicts photonics device 200" that is analogous to photonics devices 200 and/or 200'. Photonics device 200" includes substrate 202 and device layer 210" that are analogous to substrate 202 and device layer 210 and/or 210' of photonics device(s) 200 and/or 200'. Opposing sawn edges 240A and 240B of photonics device 200' are analogous to sawn edges 240A and 240B of photonics device(s) 200 and/or 200'. Upper portions 242A and 242B, overhangs 250A and 250B, and lower portions 244A and 244B are analogous to upper portions 242A and 242B, overhangs 250A and 250B, and lower portions 244A and 244B. Device layer 210 includes underlayer 212, TFLC layer 220", and dielectric 230 that are analogous to underlayer 212, TFLC layer(s) 220 and/or 220', and dielectric 230.

Passivation layers 224 have been provided on sawn edges 240A and 240B. In the embodiment shown, passivation layers 224 are only on upper portions 242A and 242B of photonic device 200". In some embodiments, passivation layers 224 may extend over some or all of lower portions 244A and 244B. In some embodiments, passivation layers 224 only extend over part of upper portions 242A and 242B. Passivation layers 224 may be oxide layers, including silicon dioxide, provided via chemical vapor deposition (CVD), including plasma-enhanced CVD, or via atomic layer deposition (ALD), after a first cut forms a groove. Passivation layer 224 may be deposited or grown. Stated differently, passivation layer 224 may be formed after upper portions 242A and 242B of sawn edges 240A and 240B. As a result, the cut(s) that remove the bottom portions of substrate 202 and form overhangs 250A and 250B may remove a portion of the CVD oxide layer. Passivation layers 224 thus remain. Because of passivation layers 224, TFLC layer 220' is recessed from the edges of photonics device 200" by a working distance analogous to working distance 222 of photonics device 200'. This working distance may be at least one hundred nanometers and not more than five hundred nanometers. Thus, TFLC layer 220" is not exposed to the ambient after passivation layers 224 are formed.

Photonics device(s) 200, 200', and/or 200" may have improved performance and fabrication. Because photonics devices 200, 200', and 200" have sawn edges 240A and 240B, their singulation may be rapidly and more readily performed. Because of the low surface roughnesses of upper portions 242A and 242B of sawn edges 240A and 240B, optical insertion losses may be reduced. As a result, performance may be improved. The presence of overhangs 250A and 250B, may facilitate alignment and coupling to optical fibers. Thus, manufacturing of devices as well as performance may be improved. Further, if parameters such as the lower spindle speed (i.e. nominal frequency of rotation of the blade), smaller grit sizes, and/or mid-range feed speed are used with a dicing system (e.g. dicing system 100) during singulation, less chipping or cracking may be present. Thus, yield may be improved. Consequently, photonic devices 200, 200', and/or 200" may have improved manufacturing and performance.

Figure 3:
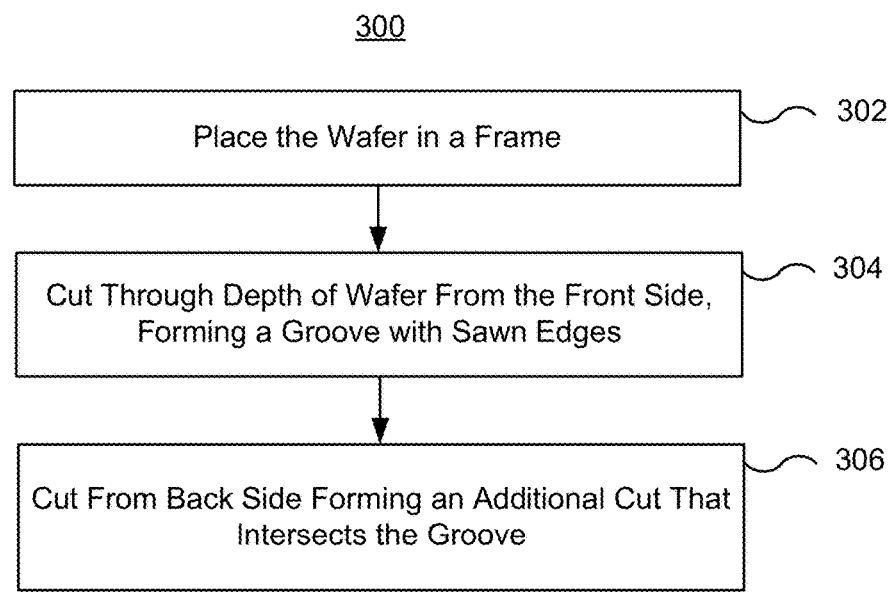
FIG. 3 is a flow chart depicting an embodiment of a method for singulating a photonics device.

FIG. 3 is a flow chart depicting an embodiment of method 300 for singulating a TFLC photonics device. Method 300 is described in the context of processes that may have subprocesses. Although described in a particular order, another order not inconsistent with the description herein may be utilized. Method 300 is described in the context of dicing system 100 and photonics device 200. However, method 300 may be utilized with other dicing systems and other photonics devices including but not limited to photonics devices 200' and/or 200".

The wafer is placed in a frame, at 302. Thus, the wafer may be temporarily affixed to tape. The substrate portion of the wafer may be placed on the tape, with the front side (e.g. the device layer) facing away from the tape. In some embodiments, alignment cuts or other alignment marks are formed. Consequently, the desired locations of the cuts may be determined.

Using a blade spinning at a nominal frequency, a cut is made by feeding the wafer proximate to the blade, at 304. The blade may be oriented perpendicular to the front surface of the wafer and the wafer fed through horizontally in order to form the cut across the surface of the wafer. The wafer is not cut through at 304. Instead, grooves are formed in the wafer. The cut, and thus the grooves are through the depth TFLC layer(s) in the wafer. In some embodiments, the cut(s) made at 302 extend into the underlying substrate. The nominal frequency of the blade at 304 is desired to be sufficiently high to form a cut, but sufficiently low that the surface roughness meets the desired criteria and chipping or delamination is reduced or avoided. In some embodiments, the nominal frequency (or nominal rpm) of is at least 20 krpm and not more than 40 krpm. In some such embodiments, the nominal rpm is at least 25 krpm and not more than 35 krpm. For example, the nominal frequency may be 30 krpm. The feed speed may be greater than three millimeters per second and not more than fifteen millimeters per second. In some embodiments, the feed speed at 302 is at least four millimeters per second and not more than ten millimeters per second). In some embodiments, the feed speed may be at nominally five millimeters per second. The blade used at 304 is desired to have a fine grit size (e.g. a #3000, #4000, or #5000 grit). A fine grit for the blade at the nominal frequency and feed speed described herein provides grooves having the desired RMS surface roughness. In some embodiments, 304 forms groove that are nominally one hundred micrometers deep.

Using a blade spinning at a nominal frequency, a cut from the back side of the wafer is made by feeding the wafer proximate to the blade, at 306. Thus, the wafer may be flipped for 306 so that the back surface is proximate to the blade. The blade may also be aligned at 306, e.g. using an infrared camera or alignment cuts, so that the cut made by the blade intersects a groove. The blade may be oriented perpendicular to the back surface of the wafer and the wafer fed through horizontally in order to form the cut across the back surface of the wafer. 306 may include switching the blade used in 304 for a wider blade and/or using other technique(s) for forming overhangs at the edges of the singulated TFLC photonics devices. The additional cut formed by at 306 may also be deeper than the groove. The cut extends from the back surface through a portion of the substrate. Because the edges of the substrate are not configured to transmit an optical signal, the surface roughness of the cut formed at 304 may be higher. Thus, the blade used at 306 may have a lower number grit (e.g. #2000). The nominal frequency of the spindle for 306 may be in the same range as for 304. In some embodiments, the feed speed for 306 may be higher than for 304. 304 may be performed multiple times. Thus, the cuts of 306 separate the photonics devices. 306 may also include expanding the tape to separate the individual photonics devices.

For example, method 300 may use dicing system 100 to produce TFLC photonics device 200 from wafer 140. Wafer 140 is attached to frame 110 such that device layer 210 is proximate to blade 120, at 302. At 304, blade 120 cuts partially through wafer 140, forming grooves. The grooves correspond to edges 240A and 240B. Because blade 120 has the nominal frequency, feed speed, and grit described for 304, upper portions 242A and 242B of sawn edges 240A and 240B have a low RMS surface roughness, for example not more than one hundred nanometers. Wafer 140 may be flipped and a new, wider blade 120 may be provided at 306. Thus, the back surface of substrate 202 is proximate to the new blade 120. Also at 306 new blade 120 is aligned to grooves formed at 304 and cuts performed. Consequently, lower portions 244A and 244B are formed in substrate 202 and photonics device 200 is singulated from wafer 140.

Thus, method 300 provides TFLC photonics devices that may have improved performance. In particular, photonics devices having a low RMS surface roughness on the portion of each of the edges that includes the device layer are formed. Consequently, the TFLC photonics device may have reduced insertion loss. Moreover, overhangs are also provided. As a result, the TFLC photonics device may be better able to be coupled with fibers, resulting in reduced insertion loss. In addition, method 300 may be relatively straightforward to implement and may have improved yield. Consequently, manufacturing of TFLC photonics devices may also be improved.

Figure 4:
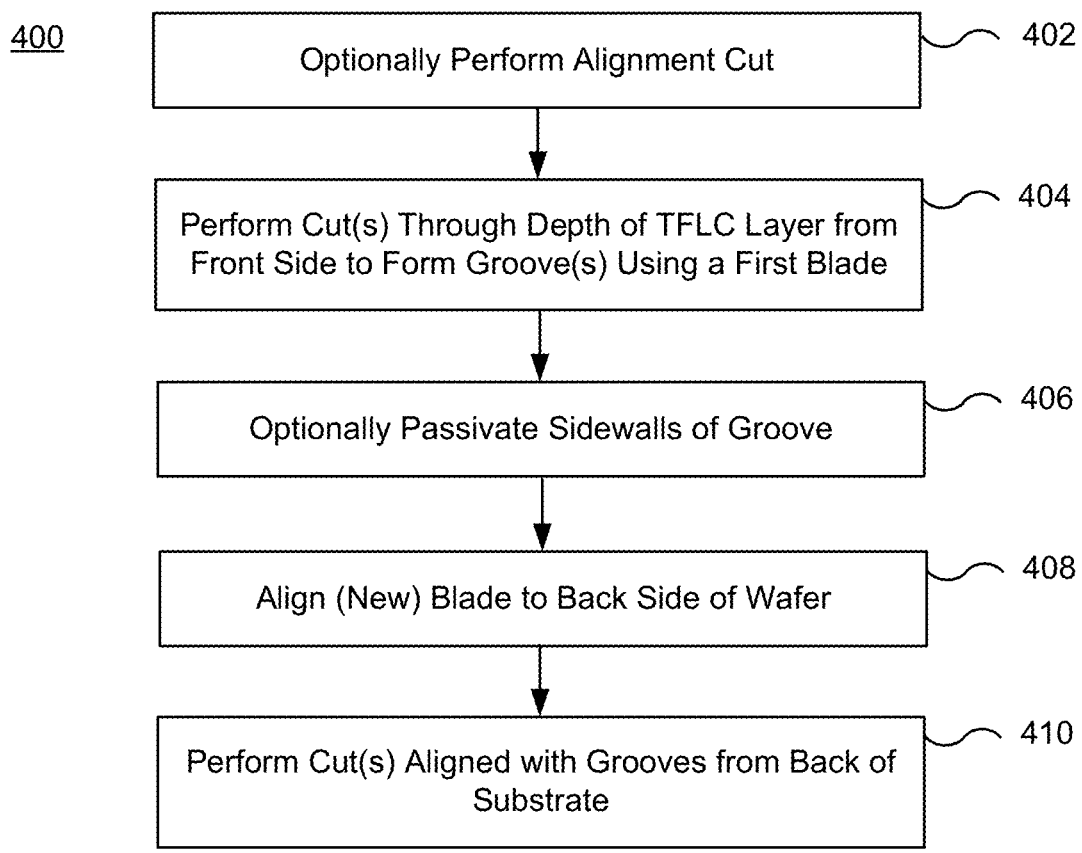
FIG. 4 is a flow chart depicting an embodiment of a method for singulating photonics devices.

FIG. 4 is a flow chart depicting an embodiment of method 400 for singulating photonics devices. FIGS. 5A-9 are diagrams depicting an embodiment of photonics devices 500 during fabrication. Method 400 is described in the context of processes that may have sub-processes. Although described in a particular order, another order not inconsistent with the description herein may be utilized. Method 400 is described in the context of dicing system 100 and photonics devices 500. However, method 400 may be utilized with other dicing systems and other photonics devices including but not limited to photonics devices 200, 200', and/or 200". Method 500 commences after the front end processing of photonics device 500 (e.g. formation of waveguides, electrodes, and/or other structures) has been completed and the wafer has been affixed to a frame.

Figure 5A:
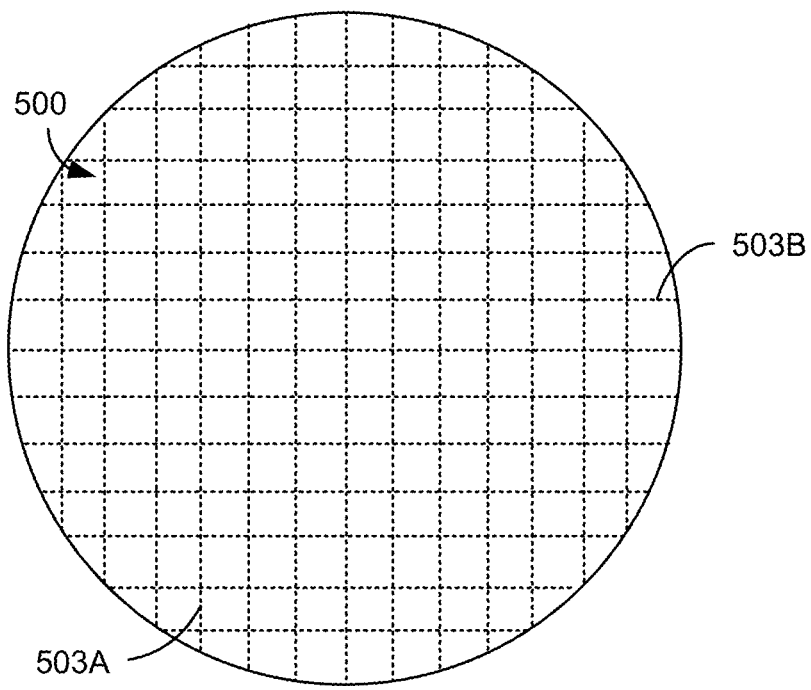
FIGS. 5A-5C are diagrams depicting an embodiment of photonics devices.
Figure 5B:
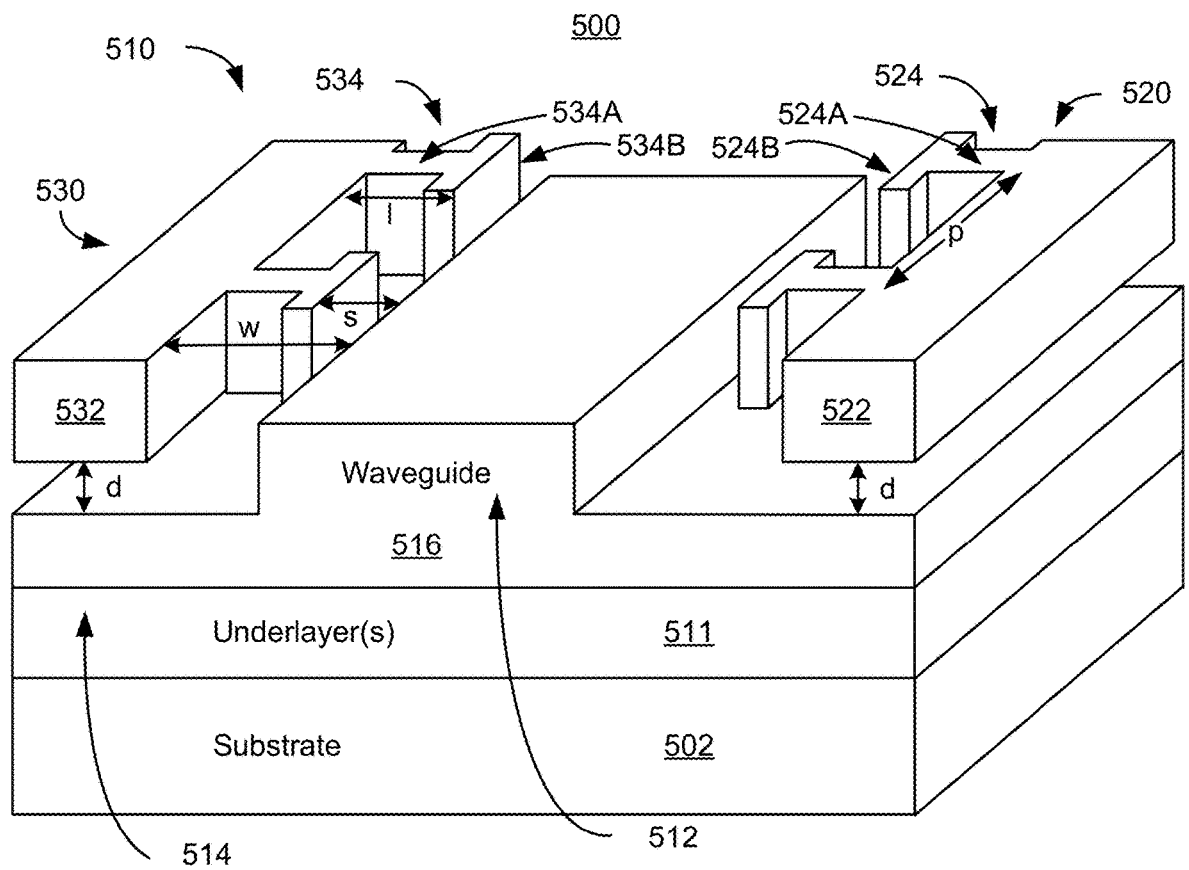
Figure 5C:
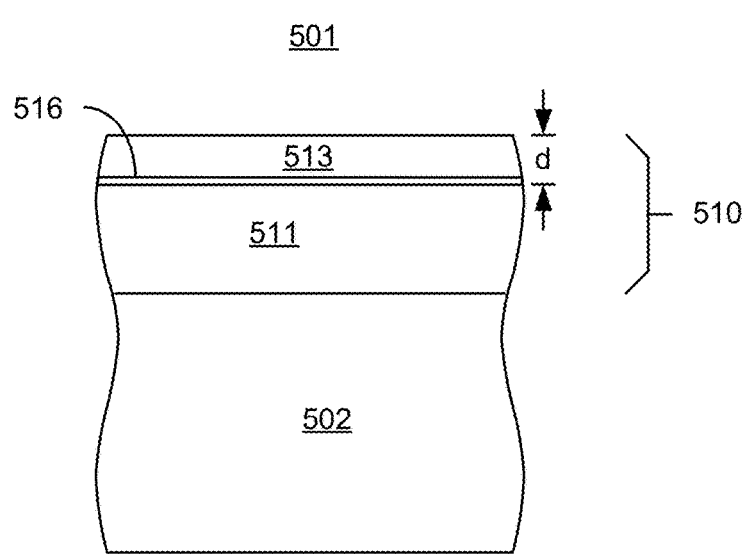

FIGS. 5A-5C depicts photonic device 500 prior to method 400. FIG. 5A depicts wafer 501 having photonics devices 500 formed thereon. Also shown in FIG. 5A are regions 503A and 503B at which photonics devices 500 are desired to be singulated. FIG. 5B depicts a perspective view of a portion of one TFLC photonics device 500 on wafer 501. For clarity, top cladding (e.g. dielectric) layer(s) are not shown. Such cladding layer(s) would cover the portions of the device depicted. Photonics device 500 may be configured differently in other embodiments. Electro-optic photonics device 500 includes a substrate 502 and a device layer 510. Device layer 510 includes underlayers 511 (e.g. a BOX layer), thin film lithium-containing (TFLC) electro-optic waveguide 516 that includes ridge waveguide 512 and slab portion 514, and electrodes 520 and 530. TFLC waveguide 516 is thus analogous to TFLC layer(s) 220, 220', and/or 220". Electrode 520 includes channel region 522 and extensions 524. Electrode 530 includes channel region 532 and extensions 534. Substrate 511 may include an underlying substrate such as Si and a BOX layer (not separately shown) in FIG. 5B. In other embodiments, photonics device 500 may include other and/or different components. In some embodiments, TFLC waveguide 516 may be configured differently. FIG. 5C is a cross-sectional view of a portion of wafer 501. Thus, substrate 502, underlayer(s) 511 (e.g. a BOX layer), and device layer 510 are shown. Also shown is oxide layer 513, which may be or include the cladding layer omitted from FIG. 5B.

Referring to FIG. 5B, electro-optic waveguide 516 is or includes a TFLC layer that may include or consist of LN and/or LT. In some embodiments, the nonlinear optical material for TFLC waveguide 516 is formed from a thin film layer. For example, the thin film may have a total thickness (e.g. of thin film or slab portion 514 and ridge waveguide portion 512) of not more than three multiplied by the optical wavelengths for the optical signal carried in waveguide 512 before processing. In some embodiments, the thin film has a total thickness of not more than two multiplied by the optical wavelengths. In some embodiments, the nonlinear optical material has a total thickness of not more than one multiplied by the optical wavelength. In some embodiments, the nonlinear optical material has a total thickness of not more than 0.5 multiplied by the optical wavelengths. For example, the thin film may have a total thickness of not more than three micrometers as-formed. In some embodiment, the thin film has a total thickness of not more than two micrometers. In some embodiment, the thin film has a total thickness of not more than one micrometer. In some embodiments, the thin film has a total thickness of not more than seven hundred nanometers. In some such embodiments, the thin film has a total thickness of not more than four hundred nanometers. In some embodiments, the thin film has a thickness of at least one hundred nanometers.

The TFLC layer may be fabricated into waveguide 516 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 512 may thus have improved surface roughness. For example, the sidewall (s) of ridge 512 may have reduced surface roughness. For example, the short-range root means square surface roughness of a sidewall of the ridge 512 is less than ten nanometers. In some embodiments, this root means square surface roughness is not more than five nanometers. In some cases, the short-range root means square surface roughness does not exceed two nanometers. In some embodiments, electro-optic device 500 has an optical loss in signal through the modulator of not more than 5 dB/cm. In some embodiments, the optical loss is not more than 2 dB/cm. In some such embodiments, the optical loss for TFLC waveguide 516 is less than 1.0 dB/cm. For example, this loss may be not more than 0.5 dB/cm in some embodiments. In some embodiments, the height of ridge waveguide 512 is selected to provide a confinement of the optical mode such that there is a 50 dB reduction in intensity from the intensity at the center of ridge waveguide 512 at ten micrometers from the center of ridge waveguide 512. For example, the height of ridge waveguide 512 is on the order of a few hundred nanometers in some cases. The height of ridge waveguide 512 may be not more than three hundred nanometers. In some embodiments, the height of ridge waveguide 512 is not more than two hundred nanometers. In some embodiments, the height of ridge waveguide 512 is not more than one hundred nanometers. However, other heights are possible in other embodiments. A portion of waveguide 512 is proximate to electrodes 520 and 530 along the direction of transmission of the optical signal (e.g. from the input of the optical signal through waveguide 512 to the modulated optical signal output). The portion of waveguide 512 proximate to electrodes 520 and 530 may the lengths described above, for example a length greater than two millimeters in some embodiments, and greater than two or more centimeters in some such embodiments. Such lengths are possible at least in part because of the low optical losses per unit length for waveguide 512 described herein. Further, the portion of waveguide 512 proximate to electrodes 520 and 530 has an optical mode cross-sectional area that is small, for example not extending significantly beyond the edges of ridge waveguide 512. In some embodiments, ridge waveguide 512 has an optical mode cross-sectional area of less than the square of the wavelength of the optical signal in the nonlinear optical material(s) (e.g. $\lambda^2$). In some embodiments, the optical mode cross-sectional area is less than 3 multiplied by $\lambda^2$, where $\lambda$ is the wavelength of the optical signal in the waveguide.

Electrodes 520 and 530 apply electric fields to waveguide 512. Electrode(s) 520 and/or 530 may be fabricated using deposition techniques, such as electroplating, and photolithography to shape the electrode 120 and/or 530. The resulting electrode 520 and/or 530 may have a lower frequency dependent electrode loss, in the ranges described herein. Electrode 520 includes a channel region 522 and extensions 524 (of which only one is labeled in FIG. 5B). Electrode 530 includes a channel region 532 and extensions 534 (of which only one is labeled in FIG. 5B). In some embodiments, extensions 524 or 534 may be omitted from electrode 520 or electrode 530, respectively. Extensions 524 and 534 are closer to waveguide 512 than channel region 522 and 532, respectively, are. For example, the distance s from extensions 524 and 534 to waveguide ridge 512 is less than the distance w from channels 522 and 532 to waveguide ridge 512. In the embodiment shown in FIG. 5B, extensions 524 and 534 are at substantially the same level as channel regions 522 and 532, respectively. In some embodiments, the extensions may protrude above and/or below the channel regions in addition to or in lieu of being at the same level. Further, if electrodes 520 and 530 are above ridge waveguide 512, extensions 524 and 534 may extend over the top of ridge waveguide 512. Stated differently, extensions 524 and 534 may be closer than the width of ridge waveguide 512.

Extensions 524 and 534 are in proximity to waveguide 512. For example, extensions 524 and 534 are a vertical distance, d from TFLC waveguide 516. The vertical distance to TFLC waveguide 516 may depend upon the cladding (not shown in FIG. 5B) used. The distance d is highly customizable in some cases. For example, d may range from zero (or less if electrodes 520 and 530 contact or are embedded in thin film portion 514) to greater than the height of ridge 512. However, d is generally still desired to be sufficiently small that electrodes 520 and 530 can apply the desired electric field to waveguide 512. Extensions 524 and 534 are also a distance, s, from ridge 512. Extensions 524 and 534 are desired to be sufficiently close to TFLC waveguide 516 (e.g. close to ridge 512) that the desired electric field and index of refraction change can be achieved. However, extensions 524 and 534 are desired to be sufficiently far from TFLC waveguide 516 (e.g. from ridge 512) that their presence does not result in undue optical losses. Although the distance s is generally agnostic to specific geometry or thickness of TFLC waveguide 516, s may be selected to allow for both transverse electric and transverse optical modes that are confined differently in TFLC waveguide 516. However, the optical field intensity at extensions 524 and 534 (and more particularly at sections 524B and 534B) is desired to be reduced to limit optical losses due to absorption of the optical field by the conductors in extensions 524 and 534. Thus, s and/or d are sufficiently large that the total optical loss for waveguide 512, including losses due to absorption at extensions 524 and 534, is not more than 50 dB or less in some embodiments, 5 dB or less in some embodiments, and/or 4 dB or less in some embodiments. In some embodiments, s is selected so that optical field intensity at extensions 524 and 534 is less than −10 dB of the maximum optical field intensity in waveguide 512. In some embodiments, s is chosen such that the optical field intensity at extensions 524 and 534 is less than −40 dB of its maximum value in the waveguide. For example, extensions 524 and/or 534 may be at least two micrometers and not more than 2.5 micrometers from ridge 512 in some embodiments. In some embodiments, extensions 524 and/or 534 may extend over waveguide 512 if d is greater than the height of the ridge for waveguide 512.

In the embodiment shown, extensions 524 have a connecting portion 524A and a retrograde portion 524B. Retrograde portion 524B is so named because a part of retrograde portion may be antiparallel to the direction of signal transmission through electrode 520. Similarly, extensions 534 have a connecting portion 5234A and a retrograde portion 534B. Thus, extensions 524 and 534 have a "T"-shape. In some embodiments, other shapes are possible. For example, extensions 524 and/or 534 may have an "L"-shape, may omit the retrograde portion, may be rectangular, trapezoidal, parallelogram-shaped, may partially or fully wrap around a portion of waveguide 512, and/or have another shape. Similarly, channel regions 522 and/or 532, which are shown as having a rectangular cross-section, may have another shape. Further, extensions 524 and/or 534 may be different sizes. Although all extensions 524 and 534 are shown as the same distance from ridge 512, some of extensions 524 and/or some of extensions 534 may be different distances from ridge 512. Channel regions 522 and/or 532 may also have a varying size. In some embodiments, extensions 524 and 534, respectively, are desired to have a length, l (e.g. l=w−s), that corresponds to a frequency less than the Bragg frequency of the signal for electrodes 520 and 530, respectively. Thus, the length of extensions 524 and 534 may be desired to be not more than the microwave wavelength of the electrode signal divided by π at the highest frequency of operation for electrodes 520 and 530. In some embodiments, the length of extensions 524 and 534 is desired to be less than the microwave wavelength divided by twelve. For example, if the maximum operation frequency is 300 GHz, which corresponds to a microwave wavelength of 440 micrometers in the substrate, extensions 524 and 534 are desired to be at smaller than approximately 37 micrometers. Individual extensions 524 and/or 534 may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 524 and 534. Thus, the pitch for extensions 524 and 534 may be desired to be not more than the microwave wavelength of the electrode signal divided by π at the highest frequency of operation for electrodes 520 and 530. In some embodiments, the pitch is desired to be less than the microwave wavelength divided by twelve. In some embodiments, the pitch is desired to be less than the microwave wavelength divided by seventy two, allowing for a low ripple in group velocity.

Extensions 524 and 534 are closer to ridge 512 than channels 522 and 532, respectively, are (e.g. s<w). In some embodiments, a dielectric cladding (not explicitly shown in FIG. 5B) resides between electrodes 520 and 530 and TFLC waveguide 516. As discussed above, extensions 524 and 534 are desired to have a length (w−s) that corresponds to a frequency less than the Bragg frequency of the signal for electrodes 520 and 530, respectively. Extensions 524 and 534 are also desired to be spaced apart from ridge 512 as indicated above (e.g. such that the absorption loss in waveguide 512 can be maintained at the desired level, such as 50 dB or less). The length of the extensions 524 and 534 and desired separation from ridge 512 (e.g. s) are considered in determining w. Although described in the context of a horizontal distance, the distance between electrode structures and the waveguide also applies for vertical configurations. Other distances between ridge waveguide 512 and channel regions 522 and/or 532 are possible.

Extensions 524 and 534 protrude from channel regions 522 and 532, respectively, and reside between channel regions 522 and 532, respectively, and waveguide 516. As a result, extensions 524 and 534 are sufficiently close to waveguide 516 to provide an enhanced electric field at waveguide 516. Consequently, the change in index of refraction induced by the electric field is increased. In contrast, channel regions 522 and 532 are spaced further from waveguide 516 than the extensions 524 and 534. Thus, channel region 522 is less affected by the electric field generated by electrode 530/extensions 534. Electrical charges have a reduced tendency to cluster at the edge of channel region 522 closest to electrode 530. Consequently, current is more readily driven through central portions channel region 522 and the electrode losses in channel region 522 (and electrode 520) may be reduced. Because microwave signal losses through electrodes 520 and 530 may be reduced, a smaller driving voltage may be utilized for electrode(s) 520 and/or 530 and less power may be consumed by optical device 500. In addition, the ability to match the impedance of electrode 520 with an input voltage device (not shown) may be improved. Such an impedance matching may further reduce electrode signal losses for optical device 500. Moreover, extensions 524 and 534 may affect the speed of the electrode signal through electrodes 520 and 530. Thus, extensions 524 and 534 may be configured to adjust the velocity of the electrode signal to match the velocity of the optical signal in waveguide 516. Consequently, the performance of optical device 500 may be improved.

Alignment cut(s) are performed on wafer 501, at 402. In some embodiments, other and/or different alignment marks may be provided. In some embodiments, 402 may be skipped. In such embodiments, an infrared camera or other technique may be used to align cuts made to the back surface of wafer 501.

Cuts in wafer 501 are performed through the depth of the TFLC layer 512, at 404. The cuts are performed along 503A and 503B. 404 uses a blade of a dicing system that has been aligned to 503A and 503B and oriented perpendicular to the front surface of the wafer 501. Waver 501 may be fed horizontally to form the cut across its surface. In some embodiments, 404 is analogous to 304 of method 300. Thus, the nominal frequency of the blade, the type of blade used (e.g. Ni having a fine, #5000 grit), feed speed, and/or other parameters are analogous to those described for 304. Thus, the nominal frequency may be at least 25 krpm and not more than 35 krpm. Such a nominal frequency may be well below the maximum operating frequency of the blade of the dicing system used.

Figure 6:
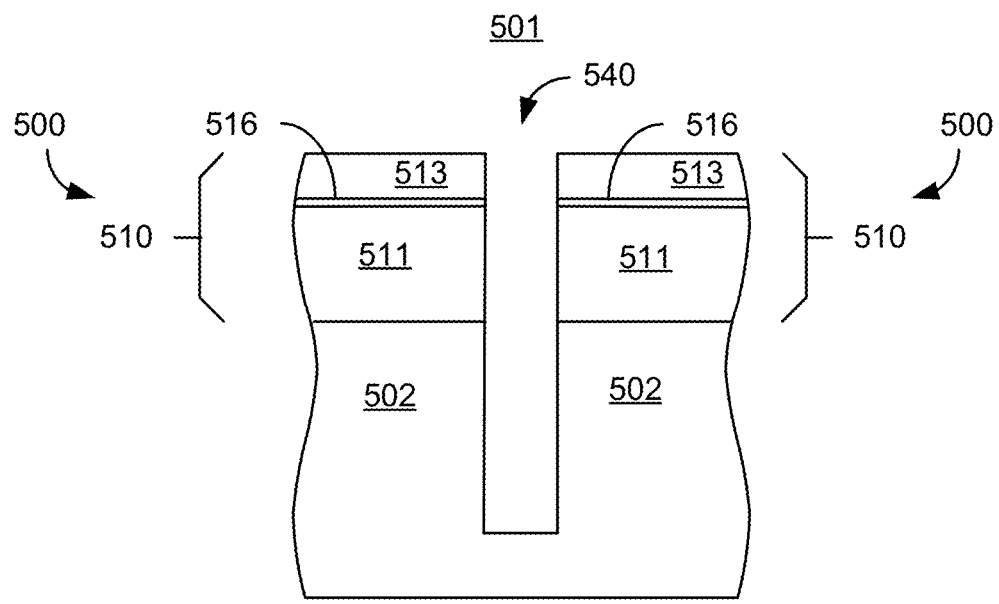
FIGS. 6-9 are diagrams depicting embodiments of photonics devices during fabrication.

FIG. 6 depicts a cross-sectional view of a portion of wafer 501 after 404 has been performed. The cut performed at 404 has resulted in groove 540. Groove 540 extends from the front surface of wafer 501 past the depth of TFLC waveguide 516. In the embodiment shown, groove 540 extends through device layer 510 and into substrate 502. However, groove 540 does not extend through substrate 502. Because of the manner in which 404 is performed, sidewalls of groove 540 have the RMS surface roughness analogous to that described for upper portions 242A and 242B of photonics devices 200, 200', and 200". For example, the RMS surface roughness of the sidewalls of groove 540 may be less than one hundred nanometers. In the embodiment shown, TFLC waveguide 516 extends to the sidewalls of groove 540. In other embodiments, TFLC waveguide 516 may terminate before groove 540.

Figure 7:
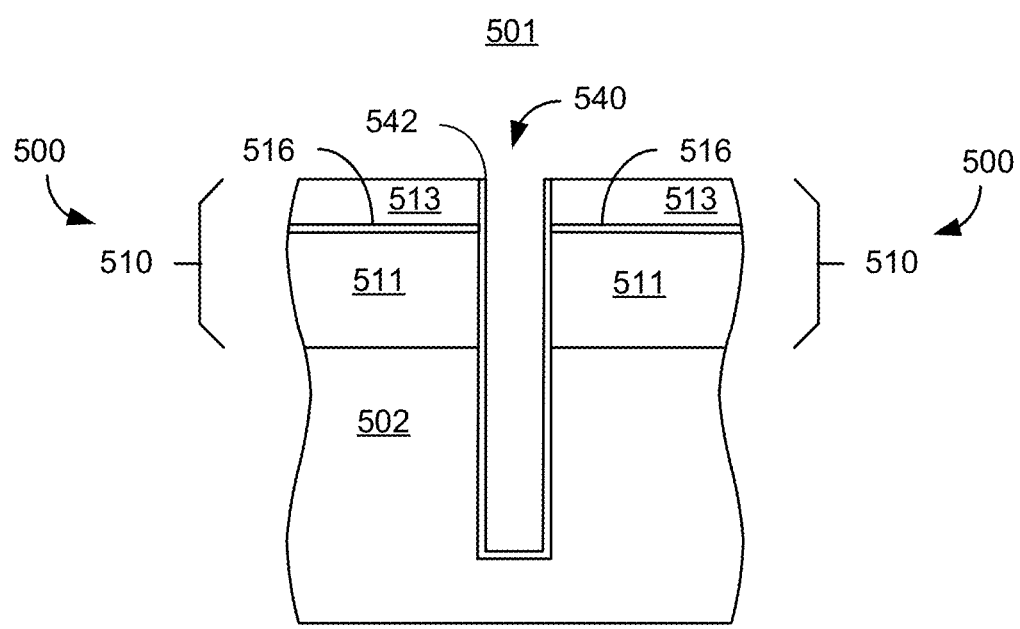

In some embodiments, the sidewalls of groove 540 may be passivated, at 406. For example, a layer of oxide may be provided via CVD. FIG. 7 depicts a cross-sectional view of a portion of wafer 501 after 406 is performed. Thus, passivation layer 542 is in groove 540.

Figure 8:
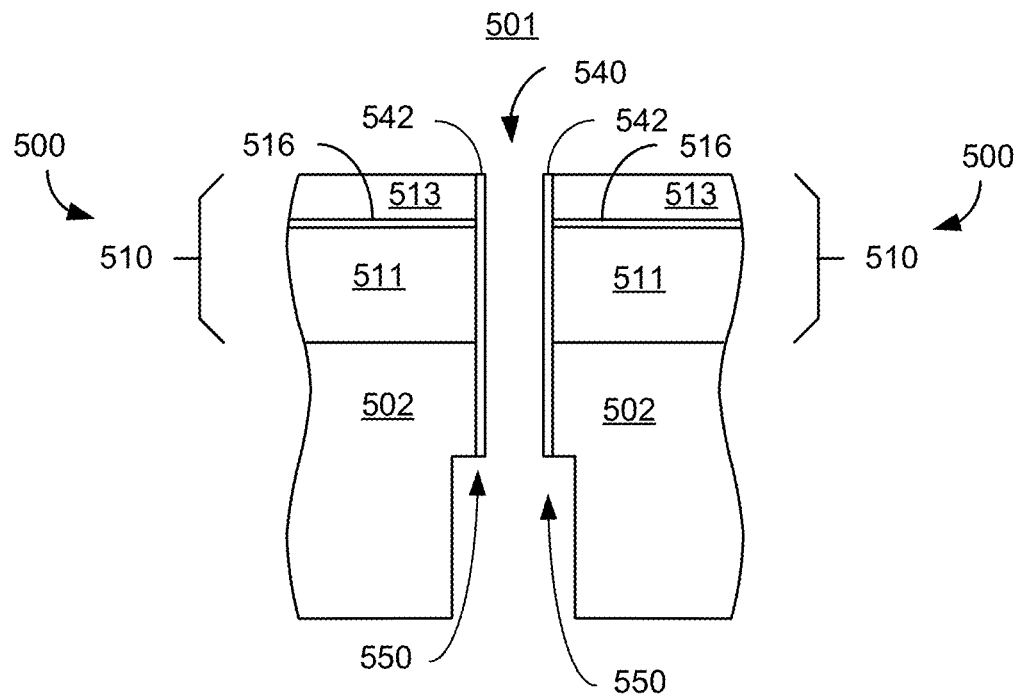

A blade of the dicing system is aligned with grooves 540 and facing the back side of wafer 501 (i.e. substrate 502), at 408. A new, wider blade may be used. Thus, 408 may include switching the blades mounted in the dicing system. In some embodiments, 408 utilizes the alignment cuts formed at 402 to align the blade to grooves 540. Cuts are performed from the back side of wafer 501, at 410. In some embodiments, 410 may be analogous to 306. Thus, a similar blade, nominal frequency, feed speed, and/or other parameters may be used at 306. The cuts made at 306 extend to groove 540. Thus, photonics devices 500 are singulated. In some embodiments, 410 also includes expanding the tape on which wafer 501 is mounted to separate individual photonics devices 500. For example, FIG. 8 depicts a cross-sectional view of a portion of wafer 501 after 410 is performed. Because the cuts performed at 410 are aligned with groove 540 and performed with a blade wider than groove 540, two photonics devices 500 are on either side of groove 540. In addition, overhangs 550 are formed for each photonic device 500. Thus, the photonics devices 500 may be substantially symmetric around the cuts made. Although not shown in FIG. 8, each photonics device 500 may have an overhang analogous to overhang 550 at its opposite edge.

Figure 9:
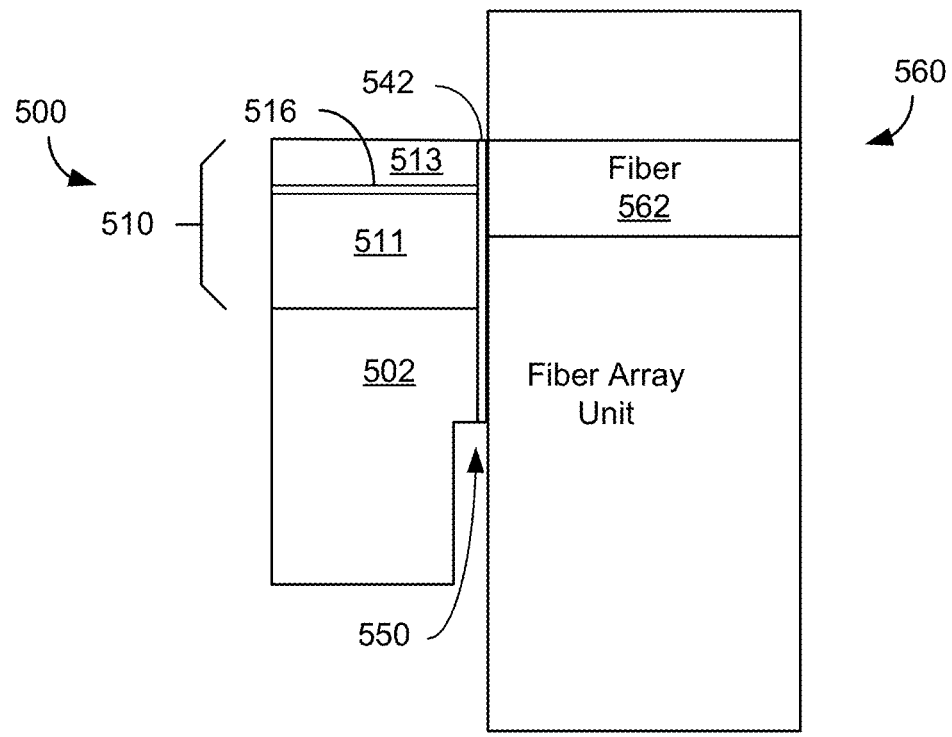

Individual photonics devices 500 fabricated using method 400 may be coupled with optical fibers. For example, FIG. 9 depicts a cross-sectional view of photonics device 500 coupled with optical fiber array unit 560 including optical fiber 562. Because of overhang 550, photonics device 500 may be more readily mounted flush to fiber array unit 560. Thus, optical coupling between TFLC waveguide 516 and optical fiber 562 may be improved.

Thus, method 400 provides TFLC photonics devices 500 that may have improved performance. Photonics devices 500 having low RMS surface roughnesses on the portions of the edges that include the device layer 510. Consequently, TFLC photonics devices 500 may have reduced insertion loss. Moreover, overhangs are also provided. As a result, TFLC photonics devices 500 may be better able to be coupled with fibers, resulting in reduced insertion loss. In addition, method 400 may be relatively straightforward to implement and may have improved yield. Consequently, manufacturing of TFLC photonics devices 500 may also be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A singulated thin film lithium containing (TFLC) photonics device comprising:
   a device layer including a TFLC layer having a depth, the device layer having a first sawn edge, the first sawn edge having a root mean square (RMS) surface roughness not exceeding eighty nanometers and an insertion loss for an optical structure including at least a portion of the TFLC layer of not more than 2.5 dB per facet;
   a silicon substrate having a second sawn edge and including:
      an upper portion having the second sawn edge that is mutually aligned with the first sawn edge; and
      a lower portion wherein the upper portion overhangs the lower portion; and
   a passivation layer deposited on the first sawn edge before the second sawn edge is formed, wherein the passivation layer separates the TFLC photonics device from a fiber array unit, and wherein the TFLC photonics device is mounted to the fiber array unit.

2. The singulated TFLC photonics device of claim 1, wherein the first sawn edge and the second sawn edge are part of a single sawn edge.

3. The singulated TFLC photonics device of claim 1, wherein the upper portion overhangs the lower portion by at least five micrometers and not more than thirty micrometers.

4. The singulated TFLC photonics device of claim 3, wherein the upper portion overhangs the lower portion by at least ten micrometers and not more than twenty micrometers.

5. The singulated TFLC photonics device of claim 1, wherein the lower portion has a third sawn edge.

6. The singulated TFLC photonics device of claim 1, wherein a portion of the passivation layer is on the upper portion of the silicon substrate.

7. The singulated TFLC photonics device of claim 1, wherein the first sawn edge has an optical insertion loss of not more than 1.5 dB.

8. The singulated TFLC photonics device of claim 1, wherein the TFLC layer includes a waveguide.

9. The singulated TFLC photonics device of claim 1, wherein the TFLC layer includes a waveguide terminating at a working distance from the first sawn edge, the working distance being at least one hundred nanometers.

10. A dicing system, comprising:
   a frame supporting a wafer having a thin film lithium-containing (TFLC) layer at a depth and a silicon substrate;
   a blade oriented to produce a cut through a surface of the wafer such that the cut extends through the depth of the TFLC layer into the silicon substrate but does not extend all the way through the silicon substrate such that a groove is formed;
   a motor that rotates the blade at a nominal revolutions per minute (rpm); and
   a delivery module that deposits a passivation layer on a surface of the groove;
   wherein the dicing system is configured to form the cut such that a first sawn edge including the TFLC layer has a root mean square (RMS) surface roughness not exceeding eighty nanometers and an insertion loss for an optical structure including at least a portion of the TFLC layer of not more than 2.5 dB per facet,
   wherein an additional blade is oriented to produce an additional cut through a back surface of the silicon substrate such that the additional cut intersects the groove,
   wherein the passivation layer is deposited on the first sawn edge before the additional cut is produced,
   wherein the wafer is mounted to a fiber array unit, and
   wherein the passivation layer separates the wafer from the fiber array unit.

11. The dicing system of claim 10, wherein the blade is dressed by the silicon substrate as it cuts through the depth of the TFLC layer.

12. The dicing system of claim 10, wherein the nominal rpm is at least 20 kilo-rpm (krpm) and not more than 40 krpm.

13. The dicing system of claim 12, wherein the nominal rpm is at least 25 krpm and not more than 35 krpm.

14. The dicing system of claim 10, wherein the cut corresponds to a feed speed of at least 4 millimeters per second and not more than 15 millimeters per second.

15. The dicing system of claim 10, wherein the blade includes Ni and is not more than 13 micrometers thick.

16. The dicing system of claim 10, wherein the groove has a surface roughness not exceeding five hundred nanometers.

17. The dicing system of claim 10, wherein the dicing system is configured to form the cut by the blade at a feed speed of at least 4 millimeters per second and not more than 10 millimeters per second and the nominal rpm of at least 20 krpm and not more than 35 krpm such that the first sawn edge including the TFLC layer has the RMS surface roughness not exceeding eighty nanometers and an insertion loss for an optical structure including at least a portion of the TFLC layer of not more than 2.5 dB per facet.

18. A method for singulating a thin film lithium containing (TFLC) photonics device from a wafer, the method comprising:

supporting the wafer in a frame, the wafer including a device layer having a TFLC layer at a depth and a silicon substrate, cutting, using a blade, through a surface of the wafer to produce a cut such that the cut extends through the depth of the TFLC layer into the silicon substrate but does not extend all the way through the silicon substrate such that a groove having a first sawn edge is formed, the blade rotating at a nominal revolutions per minute (rpm) for the cutting, the cutting further including:

forming the cut such that the first sawn edge has a root mean square surface roughness not exceeding eighty nanometers and an insertion loss for an optical structure including at least a portion of the TFLC layer of not more than 2.5 dB per facet; and depositing a passivation layer on the groove, wherein the passivation layer is on the first sawn edge;

an additional cutting, using an additional blade, through a back surface of the silicon substrate to produce an additional cut that intersects the groove, the additional blade rotating at an additional nominal rpm for the additional cutting, wherein the depositing of the passivation layer on the groove is performed before the additional cutting; and mounting the TFLC photonics device to a fiber array unit, wherein the passivation layer separates the TFLC photonics device from the fiber array unit.

* * * * *